April 22, 1952 A. R. CURIONI 2,593,543
METHOD AND MACHINE FOR SEVERING AND HANDLING
MATERIALS SUCH AS MACARONI OR SPAGHETTI
Filed Aug. 2, 1948 8 Sheets-Sheet 1

INVENTOR.
Aldo R. Curioni
BY
Norman A. Holland
ATTORNEY

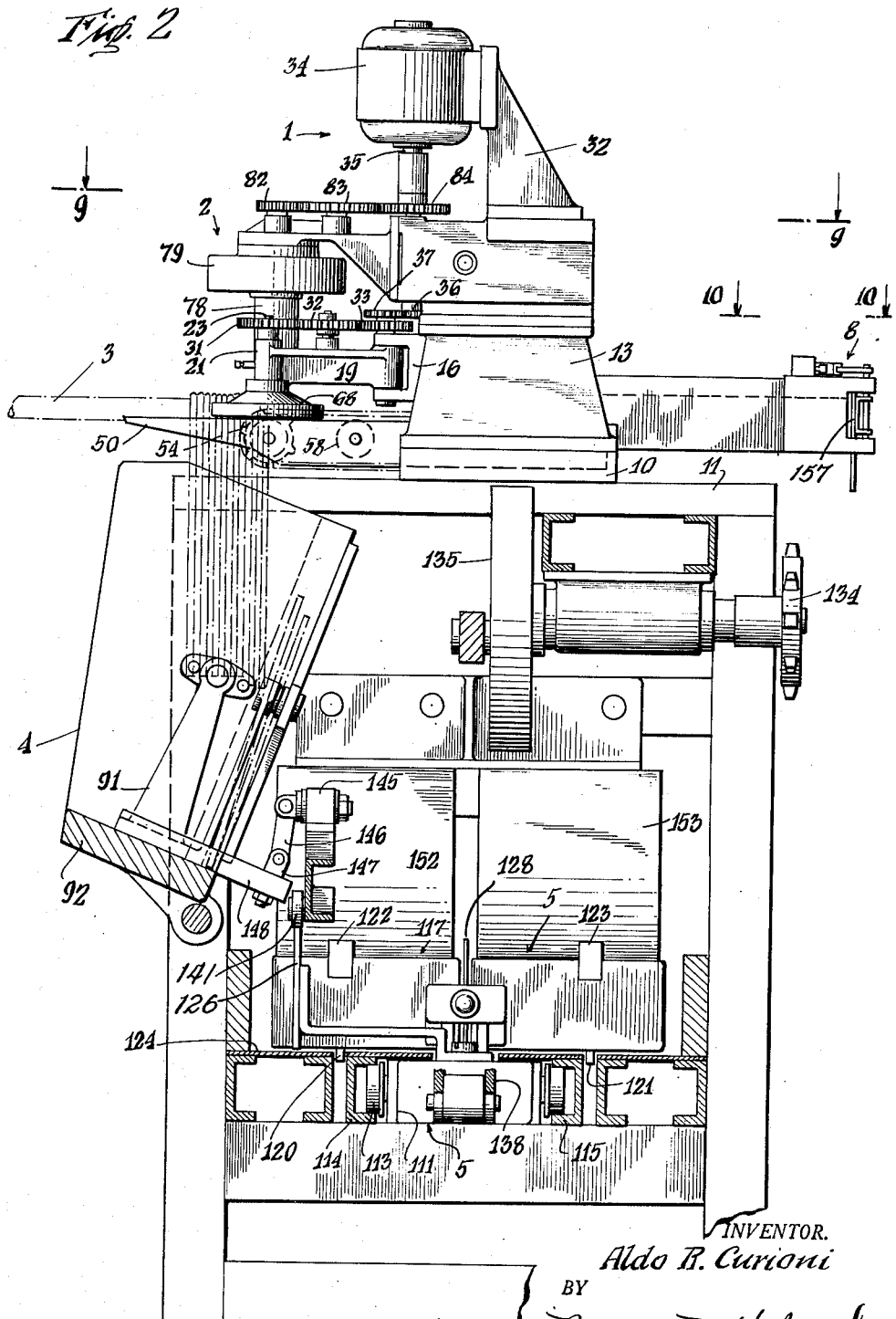

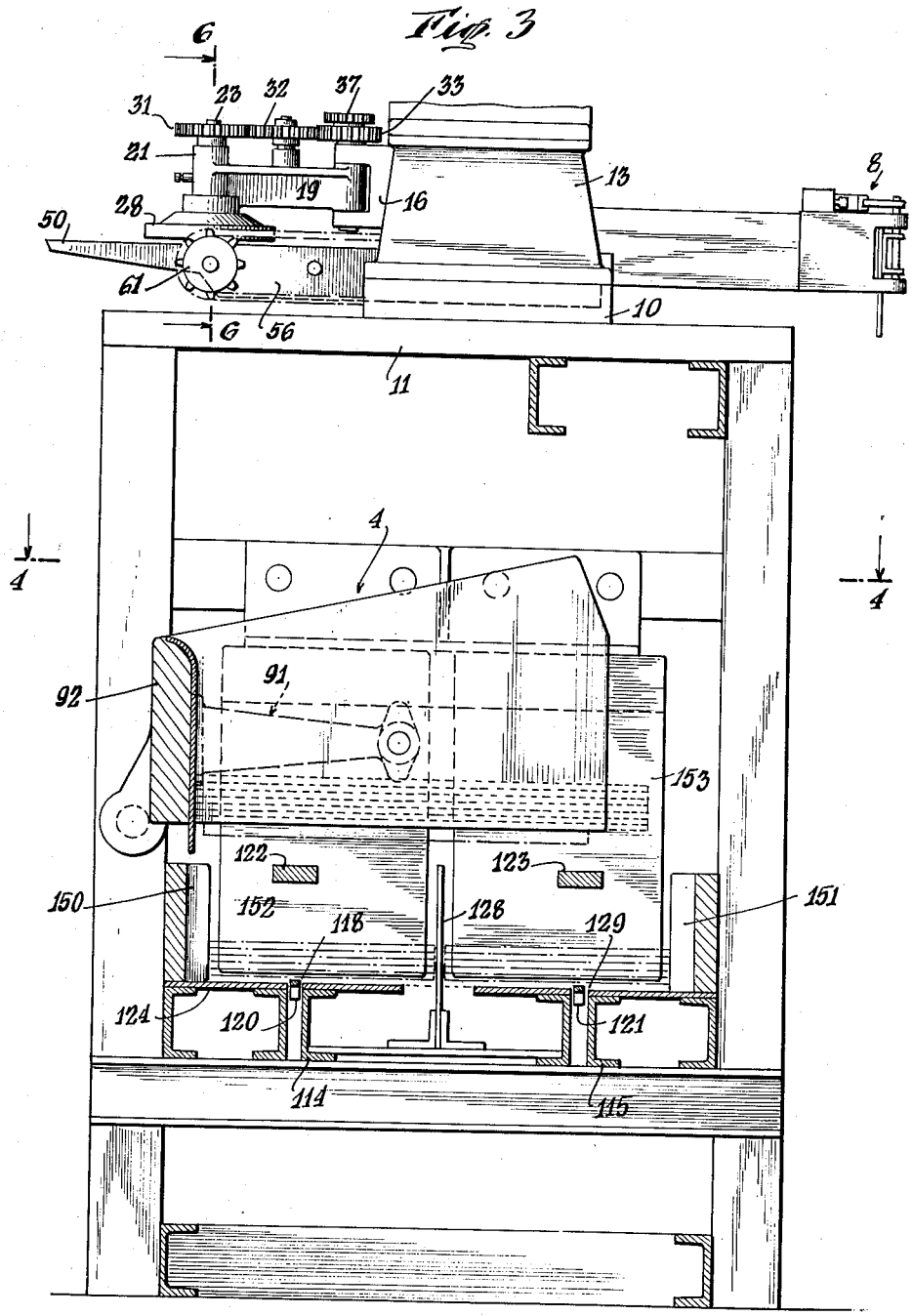

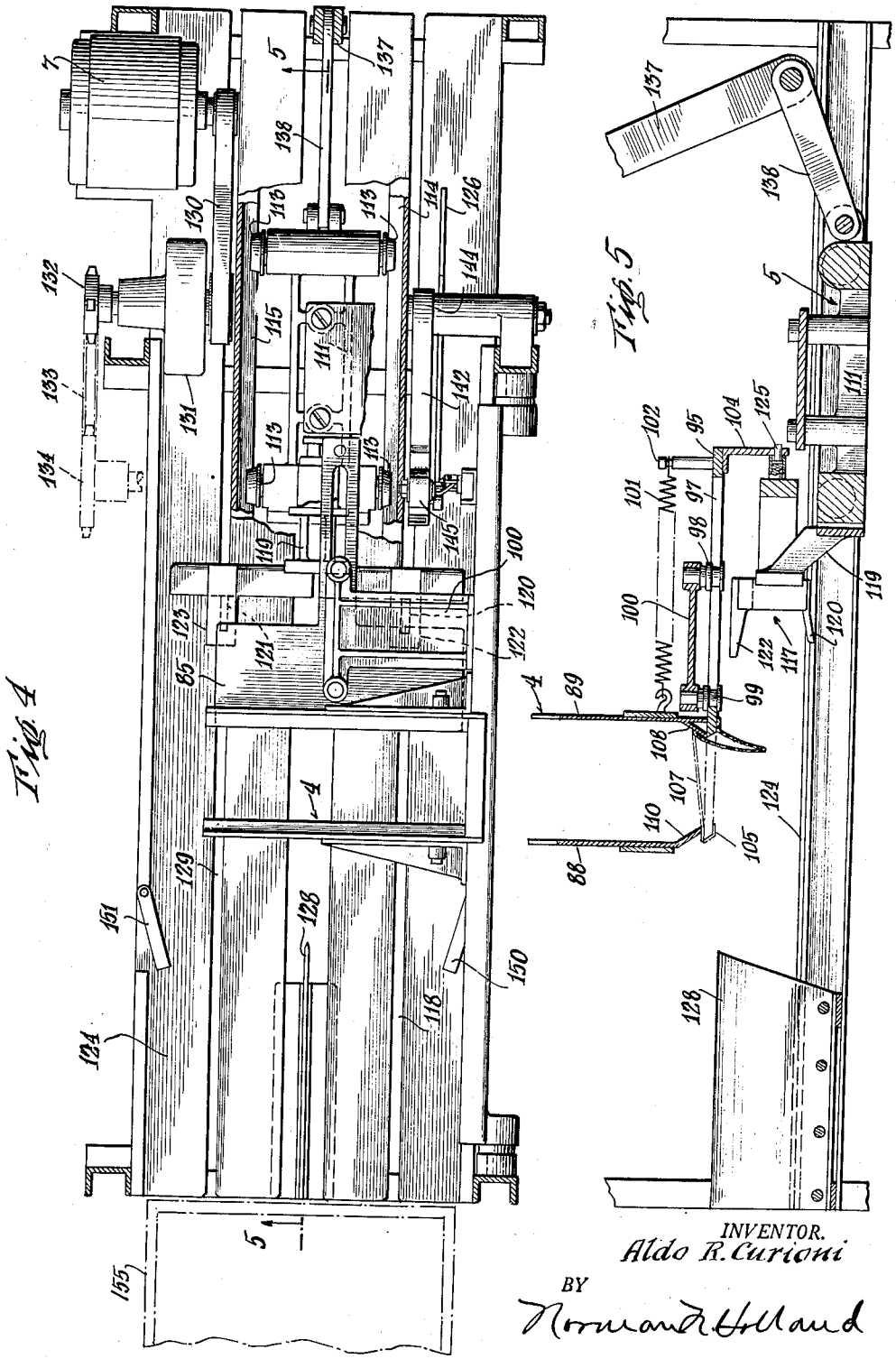

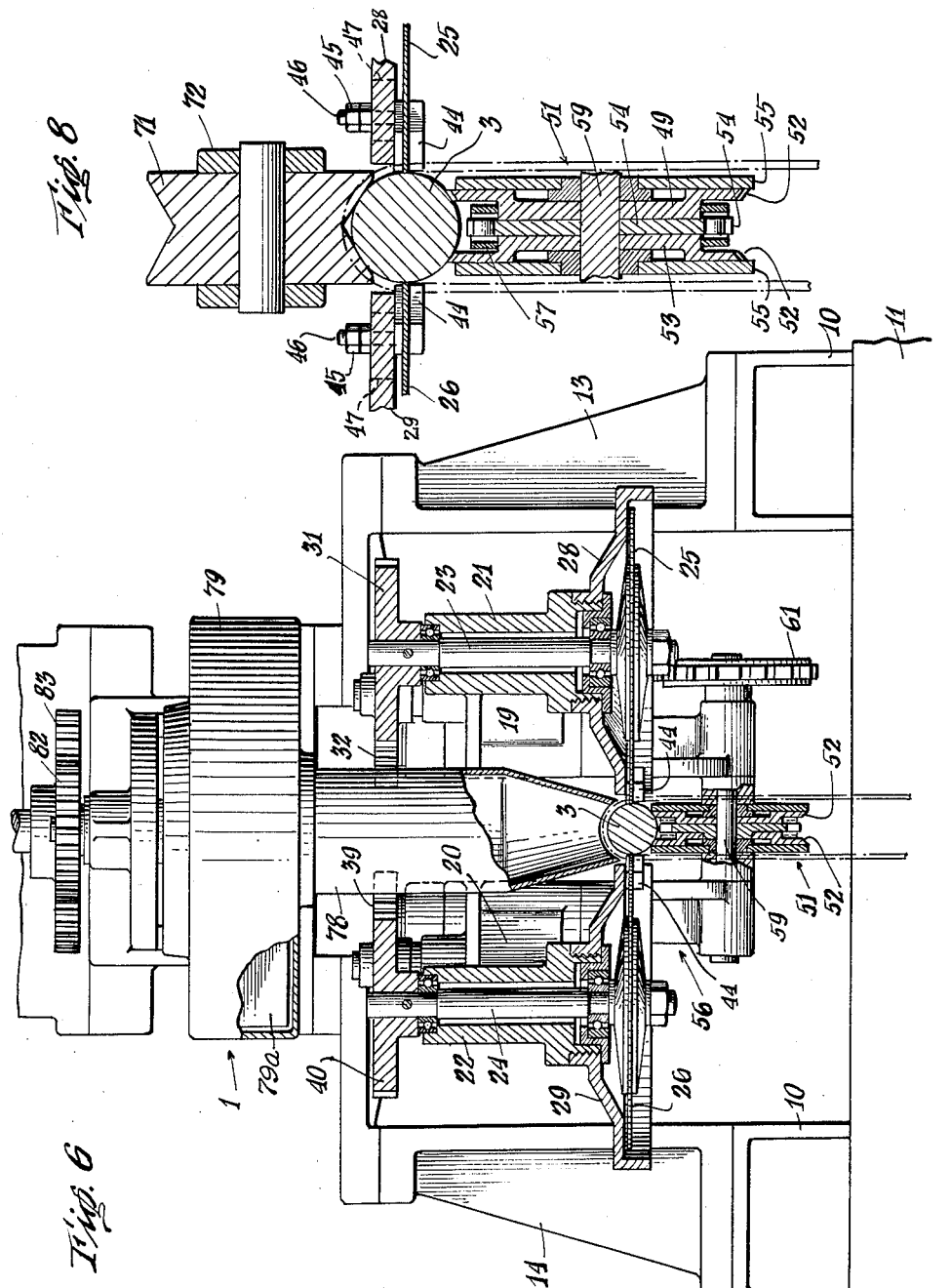

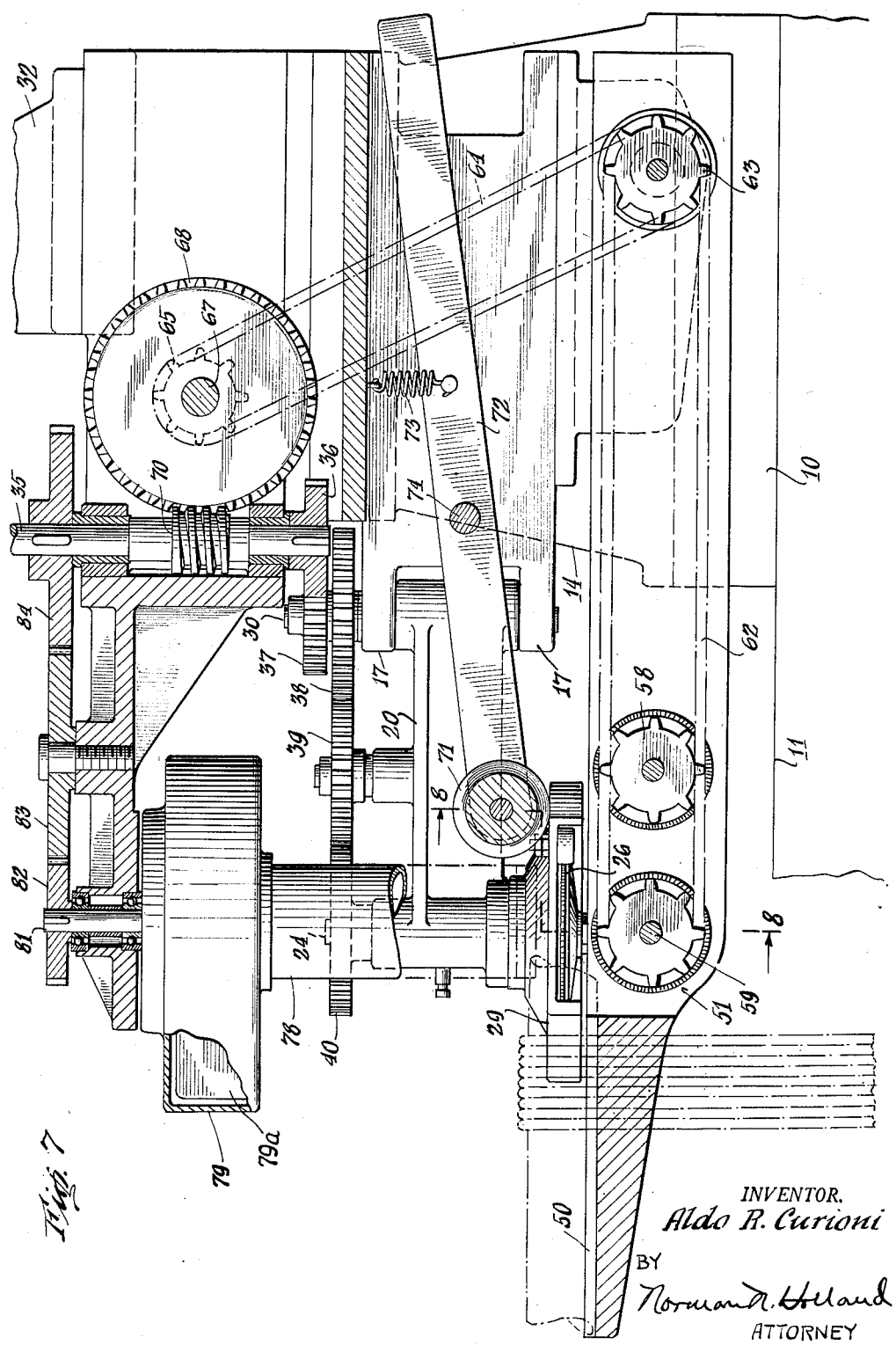

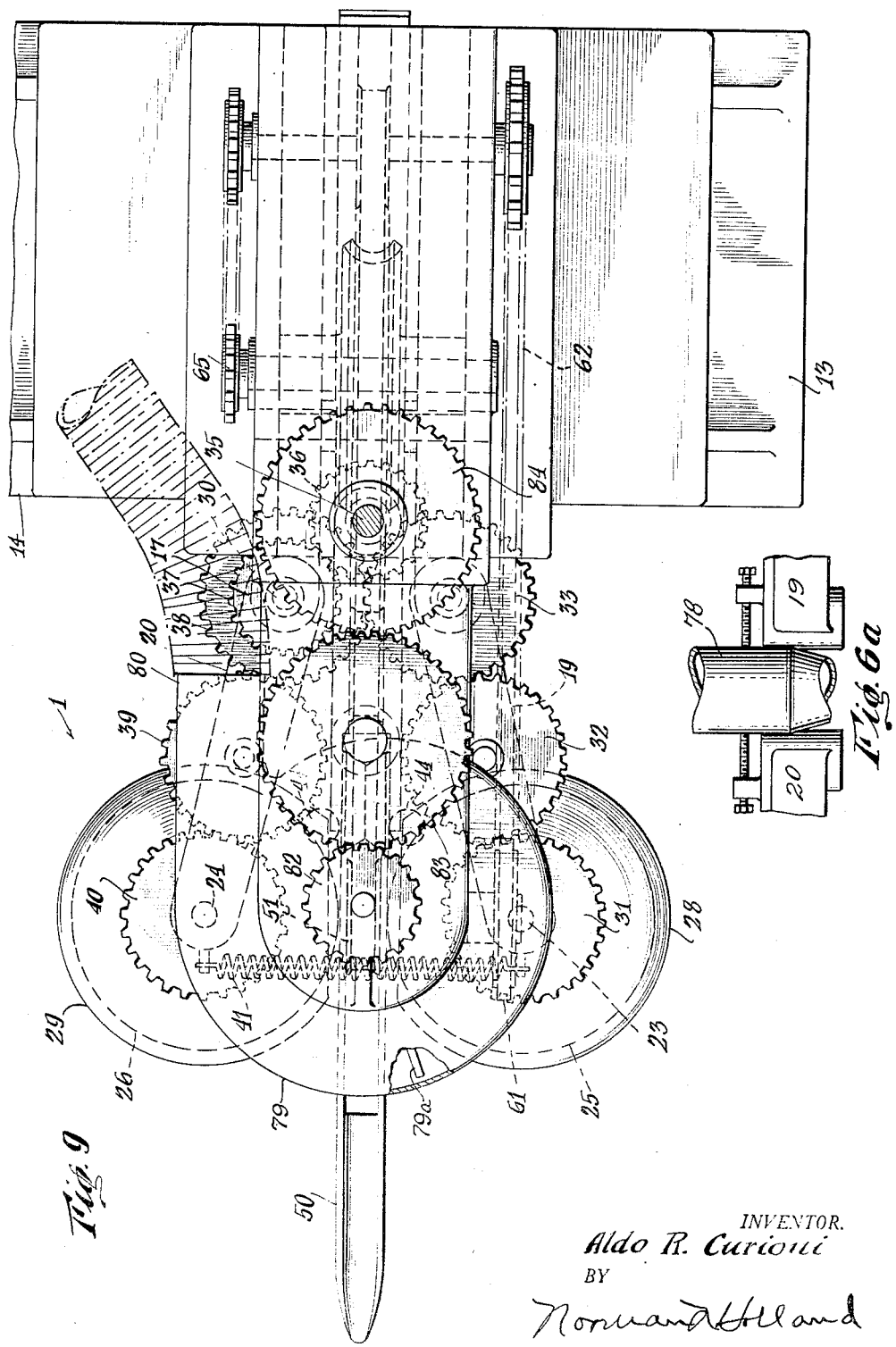

April 22, 1952 A. R. CURIONI 2,593,543
METHOD AND MACHINE FOR SEVERING AND HANDLING
MATERIALS SUCH AS MACARONI OR SPAGHETTI
Filed Aug. 2, 1948 8 Sheets-Sheet 8
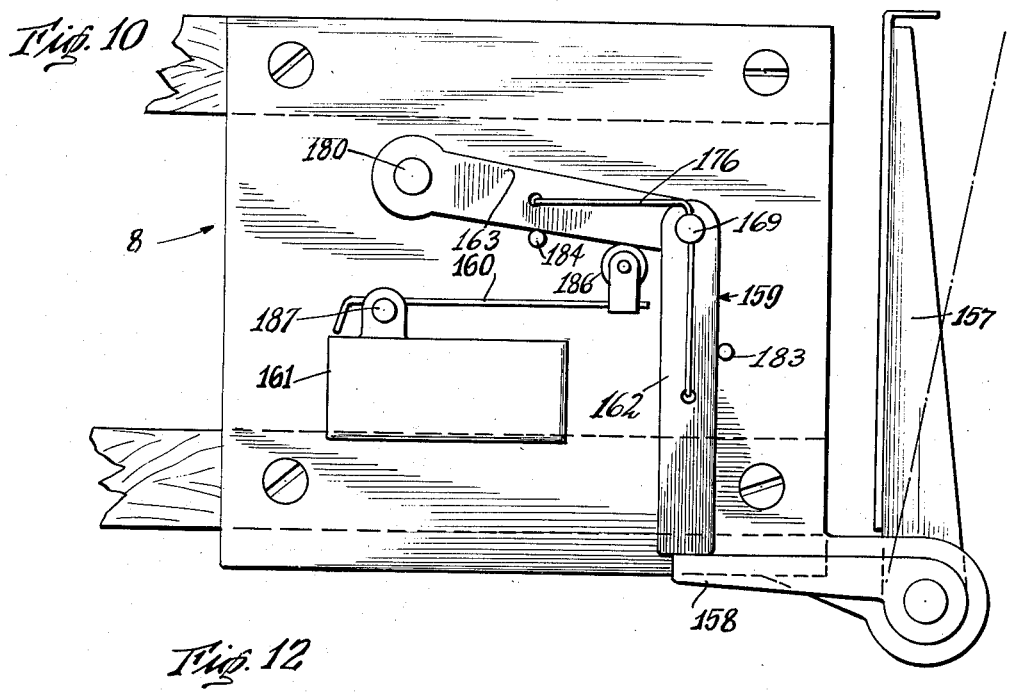
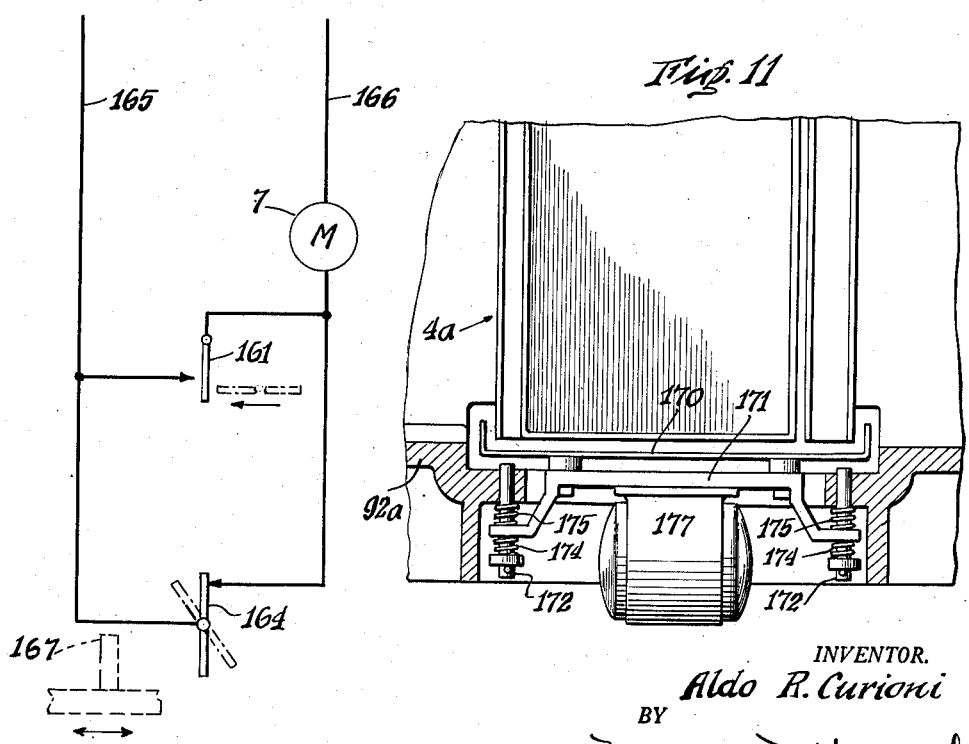
INVENTOR.
Aldo R. Curioni
BY
Norman A. Hilland
ATTORNEY Patented Apr. 22, 1952

2,593,543

UNITED STATES PATENT OFFICE 2,593,543

METHOD AND MACHINE FOR SEVERING AND HANDLING MATERIALS SUCH AS MACARONI OR SPAGHETTI

Aldo R. Curioni, New York, N. Y., assignor to Sarioni Company, Inc., New York, N. Y., a corporation of New York Application August 2, 1948, Serial No. 42,074

32 Claims. (Cl. 107—54)

The present invention relates generally to the manufacture of food products such as spaghetti, macaroni, et cetera, and more particularly to a machine or mechanism for appropriately severing substantially U-shaped lengths of such material and handling the material subsequent to severance.

One method of manufacturing products such as spaghetti or macaroni is to form the material into relatively long lengths and to suspend the lengths over wooden supporting rods or sticks, thereafter drying the material in suitable drying rooms while so supported. The material dries and hardens on the rods into substantially U-shape, the "leg" portions of which dangle downwardly at opposite sides of the supporting rod. In order to package and seal the material after it comes from the drying rooms it is desirable to remove the substantially U-shaped connecting portions which join together the straight leg portions and to cut the leg portions into suitable lengths. Performing such cutting and handling operations manually is undesirable due to the labor expense involved and also for reasons of sanitation. Apparatuses devised in attempting to minimize or overcome objections such as the above still leave considerable room for improvement in sanitation, decreased labor costs, and more fully automatic and efficient operation.

Cutting the dried and U-shaped lengths of material in such manner as to leave any part of the connecting portions or U's joined to the straight lengths of material is objectionable as the laterally extending portions give rise to handling and packaging difficulties and are also objectionable to housewives.

The present invention aims to overcome or minimize the above and other difficulties or disadvantages by providing a new and improved machine adapted to sever connecting portions or U's from the lengths of spaghetti, macaroni and other materials, to cut resulting straight leg portions into desired lengths, and to deliver the severed portions to a convenient location. The invention further contemplates the provision of means for moving severed connecting portions away from a severing location and converting them to a granulated or rough pastina condition.

An object of the present invention is to provide a new and improved machine for cutting and handling material such as spaghetti, macaroni or the like.

Another object of the invention is to provide new and improved means for severing U-shaped connecting portions from lengths of material.

Another object of the invention is to provide a new and improved means for cuttnig connecting portions from U-shaped material and for cutting resulting straight portions thereof into desired lengths.

Another object of the invention is to provide a new and improved machine adapted to sever connecting portions from U-shaped material while the material is suspended on rods and to automatically discharge empty rods from the machine.

Another object of the invention is to provide an improved rod feeding and discharging means.

A further object of the invention is to provide a machine embodying new and improved means for handling severed portions of substantially U-shaped material.

A still further object of the invention is to provide a new and improved means for controlling the handling of severed leg portions of material.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 2 is a vertical sectional view taken along the line 2—2 of Fig. 1;

Fig. 3 is a vertical sectional view showing material handling or transferring parts in a different position than illustrated in Fig. 2;

Fig. 4 is a horizontal sectional view taken along the line 4—4 of Fig. 3;

Fig. 5 is a fragmentary sectional view taken along the line 5—5 of Fig. 4;

Fig. 6 is an enlarged vertical sectional view taken along the line 6—6 of Fig. 3 and showing various severing or cutting details;

Fig. 6a is a fragmentary elevational view showing an adjusting means for the knives or cutters;

Fig. 7 is an enlarged vertical sectional view taken along the line 7—7 of Fig. 1 and showing various rod-handling and material severing details;

Fig. 8 is a sectional view taken along the line 8—8 of Fig. 7;

Fig. 9 is an enlarged horizontal sectional view taken along the line 9—9 of Fig. 2;

Fig. 10 is a fragmentary plan view taken along the line 10—10 of Fig. 2;

Fig. 11 is a fragmentary elevational view showing an alternative manner of supporting the receiver and a preferred form of vibrating mounting for a material receiving means; and Fig. 12 is a diagrammatic view showing one form of wiring arrangement for the present machine.

Figure 1:
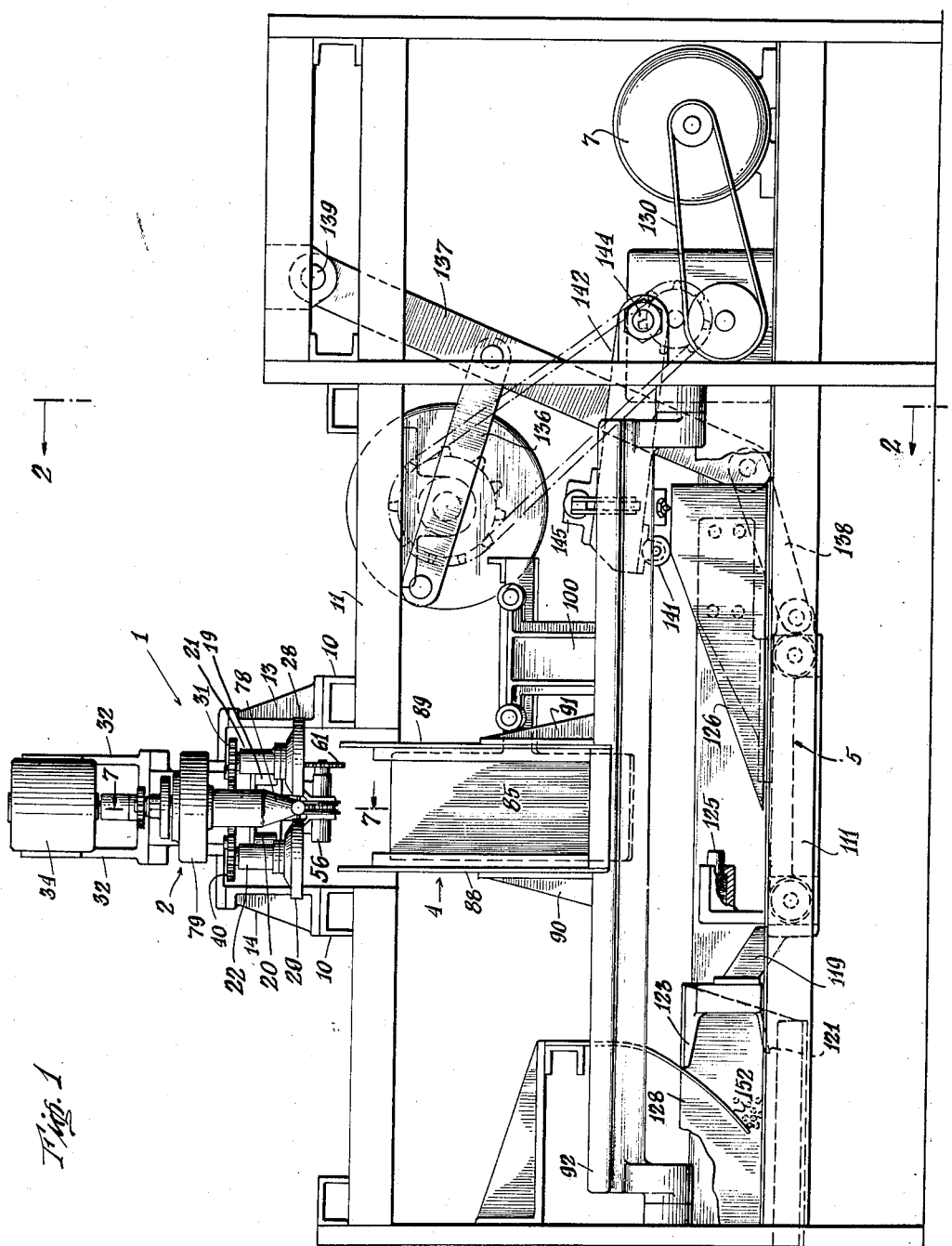
Fig. 1 is a front elevational view of the present machine, but omitting for clarity a guide means 50 shown in other figures.

Described generally the present machine comprises (Figs. 1 through 4) a "head" 1 adapted to receive and move a rod-like member 3 carrying lengths of material such as spaghetti or macaroni dangling thereon and to cut or sever the lengths of material so as to separate the U-shaped connecting portions from the relatively straight legs of the material, means 2 for removing severed U-shaped connecting portions, a receiver or collector 4 for catching and retaining severed leg portions of the material, a carriage 5 for receiving the severed leg portions discharged from the collector 4 and moving them away from it, a driving motor 7 and means operatively connecting the motor with the carriage 5 and receiver 4, and means 8 actuated by a rod 3 for operating the driving motor 7. These various parts and features will be hereinafter described in detail.

For purposes of convenience and clarity of description the substantially U-shaped material portions which are severed by the present machine will be generally referred to as "connecting portions" and the relatively straight portions, which dangle downwardly from opposite sides of a drying rod prior to severing, will be referred to generally as "leg portions."

The base or framework of the machine may be made from suitable angle irons, channels or other structural shapes and support in appropriate positions the various parts of the machine such as the head 1, receiver or collector 4, carriage 5, motor 7, and the like.

The head 1 is shown as carried by transverse channel members 10 suitably secured to longitudinal angle or channel members 11. The head 1 itself is shown comprising (Figs. 1, 2, 6-9) spaced upright brackets 13 and 14 bolted or otherwise secured to the transverse channel members 10 and provided with bifurcated or yoke-like portions 16 and 17 between the spaced arms of which are movably positioned outwardly extending cutter-carrying arms 19 and 20. Each of the arms 19 and 20 is rotatably or pivotally connected with the yoke-like portions 16 and 17 by pins which extend through aligned openings in the spaced arms of the yoke-like portions and inner ends of the movable arms 19 and 20.

The outer end of each of the arm members 19, 20 has a hollow sleeve-like portion 21 and 22, respectively (Fig. 6), through which extend rotatable shafts 23 and 24 carried by ball or other bearings adjacent the upper and lower ends of the sleeve portions. Each of the rotatable shafts 23 and 24 carries adjacent its lower end a rotary knife or cutter 25 and 26, the cutters being protectively shielded within guards 28 and 29 shown threaded onto the lower ends of the sleeve-like portions 21 and 22. The adjacent or inner portion of each guard is cut away so that the rotary knives 25 and 26 may project beyond the cut away edges thereof.

Rotation of the cutters 25, 26 is obtained as follows: The upper end of the rotatable knife carrying shaft 23 has secured thereto a gear 31 which meshes with (Fig. 9) an idler gear 32 carried by the arm 19, this latter gear in turn meshing with an additional gear 33 mounted adjacent the inner end of the arm 19. These gears, and the shaft 23 and its cutter 25, are shown turned by a drive motor 34, mounted on brackets 32, through the intermediation of shaft 35, gear 36, meshing gear 37, and gear 38 carried by the same shaft 30 which carries the driven gear 37. The co-operating cutter or knife 26 carried by the shaft 24 is rotated by the same drive motor 34 through shaft 35, gears 36 and 37, shaft 30, and gears 38, 39 and 40 carried by the arm 20. Preferably the motor 34 is rotated in such direction as to effect movement of adjacent cutter edges inwardly toward each other to urge a material carrying rod inwardly through the head portion 1 of the machine, as will be brought out in further detail hereinafter.

While the present machine is illustrated and described chiefly in connection with the use of gearing for effecting rotation of the cutters 25 and 26, it will be clear that belt drives may be utilized in the event such are deemed desirable, for example in order to obtain increased quietness of operation.

As shown in Fig. 9 the spaced knife carrying arms 19 and 20 are pulled or urged toward each other by a connecting spring 41, the spring thus serving to pull the rotary cutters inwardly toward a rod 3 carrying lengths of spaghetti, macaroni, or the like dangling thereon. Any suitable adjustable means may be provided for limiting the extent of movement together of the knife-carrying arms 19 and 20 under the influence of the connecting spring 41; for example there may be employed adjustable bolts screwed into threaded projections of the spaceable arms 19 and 20 and each abutting at one end against the other, or against a stationary part of the machine, such as the conduit 78, as illustrated in Fig. 6a.

Preferably there is associated with each of the cutters means for minimizing scoring or cutting of the rod-like members which carry the lengths of dangling material into the head 1 of the machine. As shown in Fig. 6 each of the cutter guards is provided adjacent its inner portion with an adjustable shoe or guide member comprising a downwardly extending member 44 adapted to ride against a side portion of an intermediate stick 3. The lateral positions of the shoe portions 44 may be adjusted by loosening retaining nuts 45, secured to extensions 46 of the shoes 44, and moving the extensions through adjustment slots 47 formed in the guards 28 and 29, after which the nuts may be tightened or locked into position. Preferably the edges of the cutters 25 and 26 project only very slightly beyond the edges of the shoes 44, and, since the shoes ride against opposite surfaces of the sticks 3 the cutters are prevented from objectionably digging into or scoring the sticks. Any other adjustment means for positioning the guides or shoes 44 may be utilized.

Wooden rods carrying numerous closely adjacent lengths of macaroni therealong may be placed against and initially supported upon the upper surface of an outwardly projecting guide 50. Usually the macaroni lengths do not completely cover a rod 3 so as to extend entirely to their free ends but are spaced a few inches from each end of the stick to facilitate picking them up. After an end of a stick has been placed upon the guide 50 it is moved inwardly, the dangling macaroni extending downwardly along opposite sides of the guide 50, until its inner end comes into contact with a rotating feed "wheel" 51 shown provided with spaced disc-like members having relatively small projections or teeth 52 at inwardly facing edges thereof. The wheel 51 is carried by a bracket 56 and is mounted with its upper portion substantially in line with the surface of the guide 50. It is rotated so as to draw the stick inwardly between the spaced cutters 25 and 26, which also serve to urge the stick with is supported maraconi inwardly.

The feed wheel 51 may be constructed in any suitable manner; as shown in Figs. 6 and 8 it comprises a pair of spaced discs 49, 53 provided with relatively small teeth or projections 52 adjacent their peripheries, the toothed discs being maintained in position against opposite sides of a sprocket 54 by outer retainer discs 55. The sprocket 54 meshes with a sprocket chain 57 which also passes around a second sprocket or feed wheel 58 spaced a slight distance inwardly of the wheel 51. The connecting sprocket chain 57 and spaced feed wheels 51 and 58 serve to support the moving sticks in substantially horizontal position during movement between the spaced cutters 25 and 26.

The feed wheel 51 is preferably rotated by the same drive motor 34 which drives the cutters through the intermediation of shaft 59, sprocket 61, drive chain 62, sprocket 63 carried by one end of an idler shaft, another sprocket on said idler shaft and driven by a drive chain 64, sprocket 65, shaft 67, gear 68 and worm wheel 70 carried by the shaft 35 which connects with the drive motor 34. Belts and pulleys may be used in lieu of sprockets and chains, if desired.

The stick or rod 3 which moves between the spaced cutters 25 and 26 may be held downwardly by an idler roller 71 carried by a pivoted arm 72, the arm 72 being pulled upwardly by a spring 73 about a pivot 74 to thus urge the roller 71 downwardly against the upper surface of a moving stick.

Thus as a stick loaded with lengths of spaghetti, macaroni or other material dangling thereon is placed upon the outwardly projecting guide member 50 and as its free end is pressed inwardly the feed wheel 51 cooperates with the cutters to pull the stick firmly between the cutters; the stick being held downwardly against the feed wheels 51 and 58 and supporting chain 57 by upper idler roller 71. The guide shoes 44 are positioned so that the cutting edges of the cutters 25 and 26 do not objectionably score the surface of a rod 3 (Fig. 8).

As U-shaped connected portions are severed from downwardly dangling straight lengths or legs of the material, the rod 3 moves toward the back of the machine and its end comes into contact with and serves to move a door or member 157 (Figs. 2, 3 and 10) which projects into the path of movement of the stick as it moves out of the machine. Preferably the end of a rod 3 contacts the door 157 at about the time that the material cutters 25 and 26 have completed severing the dangling material. The door is released and moves back into position after the moving rod has moved out of contact with it. The door-like member 157 is operatively connected with and effective to actuate certain other portions of the machine to be later described. When the entire length of rod has passed beyond the cutters 25 and 26 and the supporting and impelling sprockets and rollers, the rod is freed from engagement and is propected outwardly toward the rear of the machine so that it may be picked up and reused for supporting lengths of material in the drying rooms.

As U-shaped or connecting portions are severed from the downwardly dangling legs of the material the former are drawn upwardly pneumatically or by suction applied through a conduit 78 which has an open lower end positioned above the rod 3 and adjacent the cutters 25 and 26 (Figs. 1 and 6). The upper part of the conduit 78 connects with a housing 79 within which is located a suitable impeller or fan wheel 79a for drawing air through the lower open end of the conduit 78 and discharging it through an outlet portion 80. The outlet portion 80 is preferably connected by a length of flexible tubing (Fig. 9) with a receptacle so that severed connecting portions or particles picked up will be conveyed through the conduit 78, housing 79, and flexible conduit to the receptacle. In passing through the housing 79 the connecting portions are broken up by the rapidly moving impeller or fan wheel to a granulated or rough pastina condition, which may be subsequently packaged and sold. The rotatable impeller located within the housing 79 may be rotated by the cutter-driving motor 34 through rotatable shaft 81, gears 82, 83 and 84, the latter gear being keyed to the drive shaft 35 of the motor 34. Belts and pulleys may be used in the lieu of the gears. In addition to picking up severed connecting portions the pneumatic removal also serves to draw up particles or dust resulting from the cutting action of the rotating knives 25 and 26, to thus minimize the possibility of this dust interfering with the action of the machine.

Severed leg portions drop downwardly into a receiver or collector positioned beneath the cutters 25 and 26. The receiver 4 is adapted to operate in co-operation with the transfer carriage 5 and is therefore operatively connected with the carriage 5 so that appropriate movement of the carriage, under the influence of the driving motor 7, serves to raise and lower the receiver and to open and close a discharge door or gate 85 of the receiver. In Figs. 1 and 2 the carriage 5 is shown in retracted position with the receiver 4 in an upper collecting position. In Figs. 3, 4 and 5 there is shown the relationship of the parts with the carriage 5 retracted and the receiver 4 in generally or substantially horizontal discharging position, the door or gate 85 of the receiver being open for discharge of material to the carriage 5.

As shown, the receiver 4 comprises spaced side wall members 88 and 89 secured by brackets 90 and 91 to a horizontally extending support member 92, the support member 92 being rotatably or pivotally mounted adjacent opposite ends on the frame of the machine. Rotatable mounting of the support member 92 permits movement of the receiver 4 from its upper position as illustrated in Fig. 2 to the generally or substantially horizontal position illustrated in Fig. 3. The inner edges of the spaced side walls 88 and 89 are normally closed by a movable gate or door 85, so that severed lengths of material dropped into the open upper end of the receiver between the side walls 88 and 89 come to rest at their lower ends against an inwardly inclined bottom forming a part of member 92 and lean against the inclined door or gate 85 of the receiver.

The receiver door 85 is shown (Figs. 4 and 5) provided with a laterally extending arm 95 at one side, the arm being provided with a longitudinal guide slot 97 extending across the adjoining portion of the door and co-operating with spaced bearings or rollers 98 and 99 carried in turn by a bracket 100 secured to the receiver-supporting member 92. A spring 101 connected with the receiver and with a pin 102 carried by the arm 95 is shown urging the door 85 toward closed position at all times. A bracket 104 secured to the door extension arm 95 is positioned so as to be contacted by a co-operating part 125 of the movable carriage 5 so that upon appropriate movement the carriage 5 is effective to open the door 85, as will be described. Preferably the receiver door 85, includes a flexible or fabric member secured at one edge 105 to the free edge of the door 85 and at its opposite edge to a portion 106 forming another part of the delivery mouth of the receptacle 4. As the door 85 moves toward open position the length of fabric 107 curls about the open end of the door 85 and severed lengths of material roll smoothly off the fabric for delivery to the transfer mechanism 5. The fabric surface prevents severed lengths of material from accidentally jamming between operating parts of the movable door and side walls of the receiver. Preferably an inwardly inclined guiding wall 110 is provided at the opposite side of the discharge mouth of the receiver 4 to facilitate smooth discharge of material from the receiver.

While the receiver or collector 4 may be mounted fixedly in position on the support member 92 it is preferably mounted so that it may be continuously vibrated or agitated slightly. In Fig. 11 there is shown a fragmentary sectional view of a means for providing such agitation. In this figure the lower end of the modified receiver, designated generally by the reference numeral 4a, is carried by a suitably recessed and apertured support member 92a, the bottom of the receiver 4a being formed by a plate member 170 carried by a bracket member 171 that has apertures at each of its four corners through which extend mounting pins 172. The side walls of the receiver 4a and their mounting on support member 92a may be like those of the receiver 4 and their mounting brackets 90, 91 already described. That is, the modified receiver 4a is like the previously described receiver 4 except that the modified one has a bottom plate which may be vibrated; the mounting member 92a is similar to mounting member 92 except that the former is recessed and apertured as illustrated (Fig. 11) to accommodate the vibratable bottom 170 and motor 177 together with their mounting means. The bracket member 171 has positioned at opposite sides thereof and at each of the four mounting pins springs 174 and 175. To the underside of the mounting bracket 171 is secured, by bolting or otherwise, an electrical vibrator motor of any suitable commonly known and commercially available type. An example of such type motor is that utilized in massaging devices that strap to the back of an operator's hand and vibrate the hand during rubbing a portion of the body; the motor is of such construction that it vibrates when in operation and hence tends to vibrate anything to which it is secured, which in the present invention would be the bottom plate member 170. When the vibrator motor 177 is in operation the bracket member 171 is caused to vibrate or agitate and thus the bottom plate 170 of the receiver 4a is also vibrated or agitated. Agitation of this bottom member 170 together with the inclination of the receiver tends to align the severed sticks of material and facilitate operation of the machine and their delivery properly in alignment for packaging. The vibrator motor 177 may be electrically connected through suitable leads with power supply leads 165 and 166, shown in Fig. 12 and hereinafter referred to in greater detail.

The carriage 5 which transfers severed lengths of material delivered to it by the receiver 4 also serves to lower the receiver from the position shown in Fig. 2 to a delivery position shown in Figs. 3, 4 and 5. Lowering and raising of the receiver is achieved through a cam 126 which is secured to and moves with the carriage 5, the cam having an inclined upper surface against which rides a roller 141 that is operatively connected with the receiver 4. As shown the carriage 5 comprises a movable truck-like structure 111 carried by rollers 113 which travel along trackways provided by spaced inwardly facing channel members 114 and 115; the channel members extend longitudinally of the machine and are carried by its supporting framework. The truck-like structure 111 supports at its upper part, above the inwardly extending flanges of the track members 114 and 115, a pusher 117, with the pusher connected to the truck structure by an upwardly extending bracket 119. Pusher 117 is provided adjacent opposite sides thereof with outwardly extending lower finger-like members 120 and 121 and at its upper portion with outwardly extending finger portions 122 and 123. The outwardly extending pusher fingers form, with the intermediate connecting wall of the pusher, a substantially U-shaped guiding or pusher structure. The lower fingers project downwardly through longitudinal slots 118 and 129 in the surface 124 over which the pusher moves.

In retracted position (Figs. 4 and 5) the pusher 117 is at one side of the receiver 4 and a yieldably mounted finger 125 presses against the bracket 104 carried by the receiver door extension 95 to hold the receiver door 85 in open position. The finger 125 may be held against excessive outward movement by a projecting shoulder (Fig. 1) at one end of the finger which is pushed by its adjacent spring against a cooperating shoulder of the socket that contains the finger and spring. This yieldable mounting is desirable as it minimizes shock between contacting parts during movement of the pusher 117, and also provides a resilient connection which minimizes the possibility of damaging moving parts of the machine. In this relationship material severed by the cutters 25 and 26 may discharge downwardly onto the underlying table surface 124. As the pusher 117 and operating finger 125 move forwardly with the truck-like structure 111 the spring member 101 gradually closes the receiver door 85. Pusher 117 moves into contact with the lengths of material resting upon the upper surface of the platform 124 and presses the material forwardly toward a stationarily mounted cutter blade 128.

The carriage 5 comprising the truck-like structure 111, pusher 117 and door operating plunger 125, is oscillated or reciprocated by the drive motor 7 through the intermediation of drive belt 130, speed reducer 131, sprocket 132, belt or chain 133, sprocket 134, eccentric 135, connecting rod 136, and link members 137 and 138. One end of the link member 137 is rotatably attached to the framework by a pivot 139 and its opposite end is pivotally connected with the link member 138 which is in turn rotatably connected with the truck-like structure 111.

As previously brought out, raising and lowering of the receiver 4 is achieved by operatively connecting it with the carriage 5, this may be through the cam 126 carried by and movable with the carriage 5. The cam 126 may have any suitable profile and is shown operatively connected with the receiver 4 through a cam roller 141 carried by an arm 142 which is rotatably connected adjacent an end 144 thereof with the machine framework, pillow block 145, link members 146 and 147, and extension arm 148 secured to the support member 92 which carries the receiver 4.

The position of the receiver 4 is thus controlled by that portion of the operating cam 126 against which the cam roller 141 rests. In Fig. 1 the cam roller 141 is shown at the high point of the cam 126 and the receiver 4 is in its elevated position for catching lengths of material severed by the cutters 25 and 26. In Fig. 4 the cam roller is at its low point with respect to the cam 126 and the receiver has tilted inwardly to substantially horizontal position for discharge of macaroni or other straight lengths of material onto the underlying platform or table surface 124. Thus as the carriage 5 reciprocates to and fro under the influence of the driving motor 7 the receiver 4 is lowered and raised and its door 85 is opened and closed for discharge of material. As the motor 7 continues to operate, the pusher 117 moves discharged lengths of material toward the outlet end of the machine, the door 85 of the receiver 4 moves to closed position and the cam 126 lifts the cam roller 141 and other interconnecting parts to raise the receiver 4 to elevated position.

As the pusher 117 moves the severed straight length of material over the stationary surface of the table 124 toward the outlet end of the machine the material passes between inclined and laterally adjustable side portions 150 and 151 which tend to center the lengths of material with respect to a stationarily mounted knife 128. The leading edge of the knife 128 cuts or breaks the lengths of material which are pressed against it by the pusher 117. Preferably the leading edge of the knife is inclined as in Figs. 1 and 5 to facilitate the severing action and also to urge the material downwardly against the supporting surface 124 during the severing. By providing a guide member that extends from the rear edge of the stationary knife 128 to the outlet end of the machine the severed lengths of material may be maintained separated from each other. In some instances additional knives could be provided, or the knife could be omitted, depending upon the desired length of the severed leg portions.

Preferably there are also provided at opposite sides of the knife 128 downwardly extending flexible members 152 and 153 which serve to press the severed lengths of material downwardly against the upper surface of the supporting table 124 and to facilitate even and smooth flow of severed lengths past the knife 128. Lengths of material severed by the stationary knife blade 128 may be discharged into a suitable receptacle or receptacles 155.

The driving motor 7 preferably does not operate continuously but is actuated by the rods 3 that contact and move the door 157 (Fig. 10) which projects into the path of movement of the rods. The door or arm 157 may be positioned to be contacted by a rod 3 at any suitable instant, but preferably the contact occurs at about the time when the cutters 25 and 26 have completed severance of material which dangles from any particular rod 3. Since the rods 3 are all of about the same length the contact occurs at approximately similar positions of each rod. As the end of a rod comes into contact with the door 157 it moves the door and turns a lever arm 158 connected therewith which presses inwardly against a link mechanism 159. As shown, the link mechanism 159 comprises members 162 and 163 rotatably connected together by pin 169 and torsion spring 176, the member 163 being pivotally or rotatably supported on a pin 180 carried by the member 8. The torsion spring 176 tends to maintain the members 163 and 162 in the general relationship shown in Fig. 10. When the lever arm 158 moves in clockwise direction it urges the member 162 along its guide pin 183 and moves the rotatably connected member 163 away from its stop pin 184, all in opposition to the effect of torsion spring 176. As the member 163 moves away from its stop pin 184 the roller 186 carried by the arm member 160 follows behind the arm 163 and the switch 161 is operated to close and start the motor 7, as brought out hereinbelow. Movement of the link mechanism 159 operates a circuit-controlling member 160 of a switch 161 (Figs. 10 and 11), which may be of any suitable generally known type, but is preferably a small size switch such as that widely known as a "microswitch"; in such switches when the member 160 turns about a pin 187 it causes a movable part of the switch 161 (Fig. 12) to close against an adjacent contact.

Any suitable mechanism of wiring may be utilized and in Fig. 12 there is illustrated a diagrammatic arrangement of one form. When the microswitch 161 is closed by movement of a rod (indicated schematically by the dot-dash rod and arrow in Fig. 12), a solenoid or relay or the like of well known construction connected in parallel with the power lines 165, 166 (not shown) may serve to close a switch member 164, after which the microswitch 161 may automatically reopen. In this manner current may be supplied to the driving motor 7 from the power leads 165 and 166. Actuation of the driving motor 7 moves the carriage 5 forwardly and rearwardly as previously described in detail. As the carriage again approaches a "rearward" position a projection 167 thereon may contact one end of the switch member 164 to open the switch and interrupt the flow of current to the driving motor 7 thus stopping movement of the carriage. The cycle may be repeated each time a stick loaded with macaroni, spaghetti or other material is fed to the machine. Thus operation of the receiver 4 and carriage 5 to unload and transfer severed lengths of material is controlled by feeding of rods of material to the cutting or severing head 1 each time a rod passes through the severing head 1 the carriage may be set into a simple reciprocation. The machine may also be "hooked up" as that carriage reciprocation occurs for only every second rod, or for every third rod, et cetera.

Since the operation of the machine and its parts has been brought out in detail in connection with the description of its cooperating parts it is believed unnecessary to again describe the operation at this point.

While any suitable speeds of operation may be utilized highly satisfactory results have been obtained by utilizing a driving motor 7 which operates at about 1700 R. P. M., this speed being brought down by the speed reducer 131, drive chains and gearing to provide approximately twelve complete forward and retraction strokes of the carriage per minute. Any other suitable speeds of operation may be utilized.

In its finished form the various operating parts of the machine will be concealed by covering side, end and top plates.

It will be seen that the present machine provides a new and improved means for severing nearly or substantially U-shaped connecting portions from lengths of material, such as spaghetti or macaroni. The severing of the connecting portions is achieved while the lengths of material are supported upon the rods as they are received from the drying rooms. The severed lengths or legs of material are devoid of any part of the U-shaped connecting portions and hence packaging operations are facilitated and the appeal to housewives is enhanced. Severed connecting portions and any dust-like particles resulting from the cutting operation are continuously removed from the cutters and the connecting portions are broken up to form a granulated type of food products known generally as a rough pastina. Wear and tear on the machine is greatly minimized since the mechanism for delivering and transferring these straight severed lengths of material is set into operation only when a rod which carried the material is fed through and discharged from the cutting head; hence the delivering and transferring portions of the machine do not continuously operate but only when they are called upon to do so.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A machine of the class described comprising, means for moving longitudinally a rod-like member having lengths of generally U-shaped material suspended thereon and dangling downwardly at opposite sides thereof, means adapted to rest against opposite sides of a rod during said movement for cutting said suspended material to separate connecting portions from downwardly dangling portions thereof, and means for grouping together said separated formerly downwardly dangling portions subsequent to separation thereof and transferring them as groups to another location.

2. A machine of the class described comprising, means for supporting and moving longitudinally a rod-like member having lengths of generally U-shaped material suspended thereon, means including a plurality of cutters for cutting a connecting portion from leg portions of said suspended material, periodically operable means for receiving said separated leg portion and delivering them to a transferring means, means for periodically operating said receiving means to deliver said leg portions to the transferring means, and means for thereafter transferring said separated leg portions to another location.

3. A machine of the class described comprising, means for supporting and moving longitudinally a rod-like member having lengths of generally U-shaped material suspended thereon, means for cutting said suspended material adjacent locations where a connecting portion merges with a leg portion and during movement of a rod to separate upper connecting portions from lower straight portions thereof, means including a pusher member for receiving said separated lower portions and transferring them to another location, and severing means facing toward said pusher member for severing said separated lower portions during transferring thereof and upon pressing thereof against the severing means by the pusher member.

4. A machine of the class described comprising, means for supporting and moving longitudinally a rod-like member having lengths of substantially U-shaped material hanging thereon, means for cutting said material at oppositely disposed locations adjacent a rod and during movemnt of a rod to separate suspending portions from dangling portions thereof, and means for lifting said resulting separated suspending portions away from a rod-like member during movement thereof and substantially immediately upon separation thereof from the dangling portions.

5. A machine of the class described comprising, means for supporting and moving a rod-like member having lengths of material suspended thereon, means for cutting said suspended material while so suspended and separating connecting portions from leg portions thereof, and means adjacent the path of movement of a rod-like member for pneumatically moving said separated connecting portions away from a rod-like member.

6. A machine of the class described comprising, means for supporting and moving a rod-like member having lengths of substantially U-shaped material suspended thereon, means for cutting said suspended material and separating connecting portions from leg portions thereof, and suction means adjacent said cutting means for moving said separated connecting portions away from a rod-like member upon separation thereof from said leg portions.

7. A machine of the class described comprising, means for supporting and moving longitudinally a rod-like member having lengths of substantially U-shaped material suspended thereon, means for cutting said suspended material adjacent locations where connecting portions of the material join with straight leg portions thereof to separate connecting portions from leg portions thereof, means for receiving said separated leg portions subsequent to said separation and transferring them to another location, and means positioned above said connecting portions for elevating them away from the rod-like member subsequent to said separation.

8. In a machine of the class described, the combination of means for severing connecting portions from substantially U-shaped lengths of material, and means including a tubular conduit adjacent said severing means for pneumatically removing said connecting portions from the vicinity of said severing means.

9. In a machine of the class described, the combination of means for severing connecting portions from substantially U-shaped lengths of material, and suction means including a conduit with an open end for removing said connecting portions from the vicinity of said severing means.

10. In a machine of the class described, the combination of means for severing connecting portions from substantially U-shaped lengths of material, means for moving said severed connecting portions away from the vicinity of said severing means, and means for breaking said connecting portions into small pieces.

11. In a machine of the class described, the combination of rotatable cutting means for severing connecting portions from substantially U-shaped lengths of material, means for pneumatically removing said severed connecting portions from the vicinity of said rotatable cutting means, a driving motor, and means operatively connecting said driving motor with said rotatable cutting means and with said means for pneumatically removing severed connecting portions for simultaneously actuating them.

12. In a device of the class described, the combination of means for supporting a rod-like member adapted to carry substantially U-shaped lengths of material, material severing means located at opposite sides of said supporting means for separating upper portions from other portions of said material, at least one of said severing means being power driven, and means including a conduit having an opening adjacent said separated upper portions for pneumatically moving severed upper portions of material away from said rod-like member.

13. In a device of the class described, the combination of means for supporting a rod-like member carrying substantially U-shaped lengths of material thereon, material severing means disposed at opposite sides of said supporting means and at least one of said severing means being power driven, and suction-applying means including a conduit with an open end disposed adjacent said severing means and above said rod-like member for drawing severed upper portions of material away from said rod-like member after subjection of the material to the action of said severing means.

14. A machine of the class described comprising means for severing substantially U-shaped material to separate connecting portions from leg portions therof, fixedly positioned and rotatably mounted means for receiving said severed leg portions in nearly upright positions subsequent to separation from said connecting portions, means for rotating said receiving means about a generally horizontal axis to a generally horizontal position, and means for discharging said severed leg portions from the receiving means while the latter is in said generally horizontal position.

15. A machine of the class described comprising means for severing substantially U-shaped material to separate connecting portions from leg portions thereof, a receiving chamber for catching said leg portions subsequent to separation from connecting portions thereof and supporting them in nearly upright position, means for rotating said receiving chamber to a generally horizontal position and discharging the severed leg portions therefrom while the receiver is in said generally horizontal position, and means for catching said leg portions upon discharge from the receiving chamber and moving them away from the proximity of said receiving chamber.

16. A machine of the class described comprising means for severing lengths of substantially U-shaped material to separate connecting portions from leg portions thereof, suction means positioned adjacent the severing means for removing severed connecting portions from the vicinity of the severing means, a receiver positioned adjacent to and below said severing means having an inclined wall portion adapted to receive and support in inclined position severed leg portions, means for moving said receiver to a generally horizontal position and discharging severed leg portions therefrom while in said generally horizontal position, and means for thereafter moving said discharged leg portions away from the proximity of the receiver.

17. A machine of the class described comprising means for cutting lengths of substantially U-shaped material to separate connecting portions from leg portions thereof, means for receiving severed leg portions of material subsequent to separation from said connecting portions, a discharge gate normally closing an exit from said receiving means, means for moving discharged severed leg portions away from the receiving means, and means operatively connecting the leg portion moving means with the discharge gate of the receiving means and intermittently actuating the gate to deliver severed leg portions from the receiving means onto the leg portion moving means.

18. A machine of the class described comprising means for severing connecting portions from leg portions of substantially U-shaped material, means for receiving said severed leg portions of material having a movable gate-like portion, means for transferring severed leg portions away from the receiving means subsequent to delivery of said leg portions from the receiving means to the transferring means, means operatively connecting the transferring means with said gate-like portion of the receiving means for actuating the gate-like portion and delivering severed leg portions from the receiving means to the transferring means, and means for oscillating said transferring means with respect to the receiving means to intermittently move leg portions away from said receiving means.

19. A machine of the class described comprising means for severing connecting portions from leg portions of substantially U-shaped material, a receiver for collecting said severed leg portions including an actuable discharge portion, means for moving said receiver to generally horizontal position, means for transferring severed leg portions away from the proximity of the receiver after discharge from the receiver onto the transferring means, and means operatively connecting the transferring means with said actuable portion of the receiver for actuating said portion to discharge severed leg portions from the receiver onto the transferring means while the receiver is in said generally horizonal position.

20. A machine of the class described comprising means for cutting lengths of substantially U-shaped material to separate connecting portions from leg portions thereof, means for receiving said separated leg portions subsequent to separation from said connecting portions, means for vibrating said receiving means to assist in aligning leg portions received and contained therein, means for discharging said leg portions at intervals, and means for thereafter moving away from the receiving means leg portions discharged therefrom.

21. In a machine of the class described, the combination of means for moving longitudinally a rod-like member having lengths of substantially U-shaped material suspended thereon, cutters disposed at opposite sides of a rod-like member upon movement thereof through the machine adapted to separate connecting portions of the suspended material from downwardly extending leg portions thereof, and suction means substantially intermediate said cutters for drawing upwardly away from a rod-like member and from said cutters the separated connecting portions of material.

22. In a machine of the class described, the combination of means for supporting and moving longitudinally a rod-like member having lengths of substantially U-shaped material suspended thereon, rotatable cutters disposed at opposite sides of said rod-like member and above said means for moving the rod-like member adapted to separate connecting portions of the suspended material from downwardly extending leg portions thereof, and suction means substantially intermediate said cutters for drawing upwardly away from the rod-like member and from said cutters the separated connecting portions of material.

23. In a machine of the class described, the combination of means for moving a rod-like member having lengths of substantially U-shaped material suspended thereon, cutters effective to separate connecting portions of the suspended material from downwardly extending leg portions thereof, suction means for drawing upwardly away from the rod-like member and away from said cutters severed connecting portions, means for handling said leg portions subsequent to severing by the cutters, and means projecting into the path of movement of a rod-like member and actuable by a rod-like member for automatically controlling said handling means.

24. A machine of the class described comprising means for moving a rod-like member having lengths of substantially U-shaped material suspended thereon, means for cutting said suspended material to separate connecting portions from leg portions thereof, means for receiving said separated leg portions subsequent to separation, means for receiving and transferring said separated leg portions away from said receiving means, and means projecting into the path of movement of said rod-like member and operatively connected with said transferring means for initiating movement of said transferring means upon movement of the projecting means by a rod-like member.

25. A machine of the class described comprising means for supporting and moving a rod-like member having lengths of substantially U-shaped material suspended thereon, spaced cutters for cutting said suspended material at opposite sides of the rod-like member to separate connecting portions from leg portions thereof, a conduit having an open end positioned above said rod-like member and adjacent said cutters, means for drawing air into said conduit through said open end to draw severed connecting portions of said material away from said cutters, a driving motor connected with said cutters and with said air drawing means, a tiltable receiver positioned below said cutters for receiving said separated leg portions, a reciprocable carriage for receiving and transferring said separated leg portions away from said receiving means, means operatively connecting said tiltable receiver and reciprocable carriage and including a cam mounted on the carriage for tilting said receiver and effecting discharge of separated leg portions from the receiver to the carriage, means including a driving motor for reciprocating said carriage, and a door-like member projecting into the path of movement of said rod-like member and operatively connected with the carriage-reciprocating motor for initiating operation of said motor upon movement of the door-like member by a rod-like member.

26. A machine of the class described comprising means for moving longitudinally a rod-like member having substantially U-shaped material suspended thereon, means for cutting said material and separating connecting portions from leg portions thereof, means for receiving said separated leg portions and subsequently discharging them to a transferring means, means for transferring discharged separated leg portions away from said receiving means, a member projecting into the path of movement of said rod-like member and operatively connected with transferring means controlling movement of said transferring means and discharge of severed leg portions from the receiving means to the transferring means.

27. A machine of the class described comprising means for cutting materials such as macaroni while suspended on and dangling from a rod-like member, an open ended receiver below said cutting means for catching said material subsequent to cutting thereof, said receiver including a movable wall portion for supporting said material while in the receiver, and means for moving said wall portion to open the receiver and release the material from the receiver.

28. A machine of the class described comprising means for cutting materials such as macaroni while suspended on and dangling from a rod-like member, an open ended receiver below said cutting means for catching said material subsequent to cutting thereof, said receiver including a movable wall portion for supporting said material while in the receiver, means for moving said wall portion to open the receiver and release the material from the receiver, and means adjacent said movable wall of the receiver for catching the material upon movement of said wall portion.

29. The method of treating materials of the class described which comprises supporting the material to be treated on a rod-like member so that leg portions hang downwardly at opposite sides of the rod-like member and are supported by a connecting portion, placing said rod-like member with the material supported thereon in alignment with and moving it through a space between spaced cutters to separate said connecting portion from said leg portions of said rod, and withdrawing the resulting separated connecting portion generally upwardly away from the vicinity of said rod-like member and the cutting zone.

30. The method of treating materials of the class described which comprises supporting the material to be treated on a rod-like member so that leg portions hang downwardly at opposite sides of the rod-like member and are supported by a connecting portion, separating said connecting portion from said leg portions, moving the separated leg portions away from the zone at which the separation of said portions is effected and severing them into shorter lengths during such movement, and elevating the separated connecting portions away from the separating location.

31. A device of the class described comprising, a plurality of cutters having horizontally spaced cutting edges in alignment with and facing inwardly toward the path of movement of a rod, means for supporting between said spaced cutting edges and in alignment therewith a rod having lengths of material suspended therefrom, and rotatable means beneath the path of movement of said rod for engaging the underside of the rod and moving it longitudinally between said spaced cutting edges to thereby separate upper portions of suspended material from lower portions thereof.

32. A device as claimed in claim 31 in which said means for moving a rod is provided with teeth for engaging the rod.

ALDO R. CURIONI.

REFERENCES CITED

The following references are of record in the file of this patent:

UNITED STATES PATENTS

| Number | Name | Date |
|---|---|---|
| 1,029,058 | Gammel | June 11, 1912 |
| 1,242,542 | Gammel | Oct. 9, 1917 |
| 1,353,077 | Smith | Sept. 14, 1920 |